(12) United States Patent
Kopetz

(10) Patent No.: US 8,464,065 B2
(45) Date of Patent: Jun. 11, 2013

(54) PROCEDURE AND ARCHITECTURE FOR THE PROTECTION OF REAL TIME DATA

(75) Inventor: Hermann Kopetz, Baden (AT)

(73) Assignee: FTS Computertechnik GmbH, Vienna (AT)

( * ) Notice: Subject to any disclaimer, the term of this patent is extended or adjusted under 35 U.S.C. 154(b) by 582 days.

(21) Appl. No.: 12/602,731

(22) PCT Filed: Jun. 10, 2008

(86) PCT No.: PCT/AT2008/000202
§ 371 (c)(1),
(2), (4) Date: Dec. 2, 2009

(87) PCT Pub. No.: WO2008/151339
PCT Pub. Date: Dec. 18, 2008

(65) Prior Publication Data
US 2010/0180123 A1   Jul. 15, 2010

(30) Foreign Application Priority Data
Jun. 11, 2007   (AT) .................... A 903/2007

(51) Int. Cl.
*H04L 9/00*   (2006.01)

(52) U.S. Cl.
USPC ........... 713/176; 713/155; 713/156; 713/157; 713/168; 713/179

(58) Field of Classification Search
USPC ........... 713/155–157, 159, 176–177; 380/280
See application file for complete search history.

(56) References Cited

U.S. PATENT DOCUMENTS

| | | | |
|---|---|---|---|
| 6,615,350 B1 | 9/2003 | Schell et al. | |
| 7,194,620 B1* | 3/2007 | Hayes | 713/157 |
| 7,412,524 B1* | 8/2008 | Gupta et al. | 709/229 |
| 7,844,687 B1* | 11/2010 | Gelvin et al. | 709/220 |
| 7,925,013 B1* | 4/2011 | Washington | 380/44 |
| 2003/0001776 A1* | 1/2003 | Hannah et al. | 342/387 |
| 2004/0111189 A1* | 6/2004 | Miyazawa et al. | 701/1 |
| 2004/0151323 A1* | 8/2004 | Olkin et al. | 380/280 |
| 2006/0031696 A1* | 2/2006 | King et al. | 713/400 |

(Continued)

FOREIGN PATENT DOCUMENTS

| | | |
|---|---|---|
| EP | 1512254 | 3/2005 |
| WO | 02/054704 | 7/2002 |
| WO | 2004/023302 | 3/2004 |

OTHER PUBLICATIONS

International Search Report, mailed Jan. 30, 2009, completed by EP ISA.

(Continued)

*Primary Examiner* — Beemnet Dada
*Assistant Examiner* — Sayed Beheshti Shirazi
(74) *Attorney, Agent, or Firm* — Joseph E. Maenner; Maenner & Associates, LLC

(57) ABSTRACT

The object of the present invention is to safeguard the authenticity and integrity of real-time data in a distributed real-time computer system. The present invention considers other requirements of real-time data processing, such as the timeliness of real-time data transmission and limited resource availability. Frequent modification of an asymmetric key pair hinders intruders from cracking a key before its validity has expired. The present method can also be extended to safeguard the confidentiality of real-time data. It can be implemented efficiently on a multiprocessor system-on-chip (MP-SoC).

19 Claims, 2 Drawing Sheets

U.S. PATENT DOCUMENTS

| | | | | |
|---|---|---|---|---|
| 2006/0236101 | A1* | 10/2006 | Qiao et al. | 713/168 |
| 2007/0006150 | A9* | 1/2007 | Walmsley | 717/120 |
| 2007/0111795 | A1* | 5/2007 | Choi et al. | 463/42 |
| 2007/0143623 | A1* | 6/2007 | Walmsley et al. | 713/176 |
| 2007/0198879 | A1* | 8/2007 | Yim et al. | 714/712 |
| 2008/0089515 | A1* | 4/2008 | Botz | 380/44 |
| 2008/0298579 | A1* | 12/2008 | Abu-Amara | 380/30 |
| 2009/0122812 | A1* | 5/2009 | Steiner et al. | 370/503 |
| 2010/0031024 | A1* | 2/2010 | Hayes | 713/156 |
| 2010/0031064 | A1* | 2/2010 | Walmsley | 713/194 |
| 2011/0035491 | A1* | 2/2011 | Gelvin et al. | 709/224 |

OTHER PUBLICATIONS

Hermann Kopetz, Real-Time Systems Design Principles for Distributed Embedded Applications, 2002 and 1997, pp. 45-70, Kluwer Academic Publishers, Boston, US.

Wikipedia, RSA Cryptosystem, Jun. 2007, URL: http://en.wikipedia.org/wiki/RSA_cryptosystem.

IEE Standard 1588 for clock synchronization, URL: http://standards.iee.org.

* cited by examiner

PROCEDURE AND ARCHITECTURE FOR THE PROTECTION OF REAL TIME DATA

CROSS REFERENCE TO RELATED APPLICATIONS

The present application is a U.S. National Stage Application of PCT application Serial No. PCT/AT2008/000202, filed on 10 Jun. 2008, which claims priority from Austrian Patent Application Serial no. A903/2007, filed on 11 Jun. 2007, both of which are incorporated by reference in their entireties.

BACKGROUND OF THE INVENTION

This invention relates to a method and a distributed, real-time computer architecture for safeguarding the integrity and authenticity, and furthermore the confidentiality of real-time data maintained in the system.

The increasing dissemination of embedded systems and their connection to the interne requires innovative methods and architectures to ensure data security in these systems. The present invention discloses a method and an architecture that guarantee the integrity and authenticity, and furthermore the confidentiality of real-time data in embedded systems within the boundary conditions that are characteristic for these systems.

The boundary conditions that are characteristic for embedded systems are:
- The main problem with security in embedded systems is guaranteeing the authenticity and integrity of the data, but not nearly so much as their confidentiality.
- Real-time data must be processed in a timely manner with minimal delay to minimize downtime in the system and so as not to degrade the quality of control.
- The resources available for the encryption of real-time data are often limited
- It must be assumed that the maintenance personnel are not always trustworthy.
- Effort devoted to the administration of security must be kept to the minimum possible.

The present method for ensuring the authenticity and integrity of real-time data was developed from consideration of the following principles:
- It is assumed that all communication channels are publicly accessible (e.g., through wireless connections, where they can be accessed without much effort) and thus are not secure.
- The security mechanisms should produce no time delay in the processing of real-time data, so that processing quality will not be negatively affected. The computing time for safeguarding real-time data in real-time processes should be relatively short.
- Real-time data often have a limited validity period. The period of time during which real-time data must be handled confidentially will affect the necessary effort required for their encrypting.
- It is assumed that staff members who maintain the embedded system cannot always be considered trustworthy. The security mechanisms must also function when the maintenance personnel are not trustworthy.

BRIEF SUMMARY OF THE INVENTION

The present invention safeguards the authenticity and integrity of real-time data in a distributed real-time computer system. The present invention considers the special requirements of real-time data processing, such as the timeliness of real-time data transmission and limited resource availability. Frequent modification of an asymmetric key pair hinders intruders from cracking a key before its validity has expired. The present method can also be extended to safeguard the confidentiality of real-time data. It can be implemented efficiently on a multiprocessor system-on-chip (MPSoC).

BRIEF DESCRIPTION OF THE DRAWINGS

Examples of the above-described object and other new properties of the present invention are explained in the diagrams provided. In these.

DETAILED DESCRIPTION OF THE PRESENT INVENTION

Figure 1:
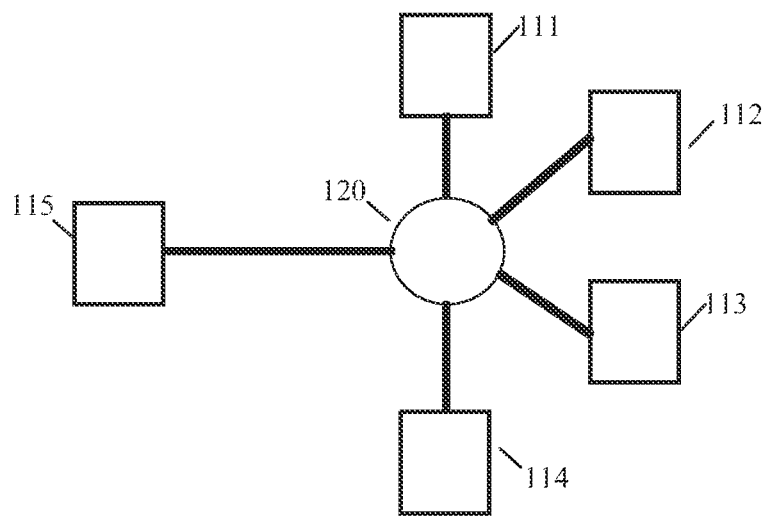
FIG. 1 shows the constitution of a distributed real-time system.

In the following section is described an embodiment of the new method with three computers 111, 112, 113, a security monitor 114, and a certification authority 115. It is further assumed that there is a trusted security center (or a corresponding entity) that securely provides sensitive startup data, and that a time server is present that specifies the time.

All computers including computers 111 through 115 have access to a distributed, common (sparse) time base. A time base is sparse if it is constructed from a series of alternating of activity and rest intervals. Events that are controlled by the system (e.g., sending of messages) should only take place during activity intervals. All events that occur within the same activity interval are considered simultaneous. Events that occur within different activity intervals are in a consistent, system-wide temporal order. The introduction of a sparse time base makes it possible to determine the simultaneity and the temporal order of events consistently system-wide. The duration of the activity interval and rest interval is determined by the accuracy of the given clock synchronization. The clock synchronization can either performed centrally by a time server, or it can be realized through distribution by an error-tolerant algorithm. A time server is a computer that either makes available an exact internal time base and/or has access to an external time signal, e.g. GPS (General Positioning System) that provides the reference time. According to the proposed method, messages that contain a time standard are encrypted.

The subjects of both sparse time base and central and distributed clock synchronization are treated exhaustively in Kopetz, H. (1997). Real-Time Systems, Design Principles for Distributed Embedded Applications.

The proposed method is based on the use of an asymmetric cryptosystem, the RSA method disclosed in 1977 and named after the inventors Ronald L. Rivest, Adi Shamir and Leonard Adleman. In the RSA method, a key pair is generated whereby a private key is used by the sender of the data to generate a signature, and the associated public key is made available to the public for checking the signature, to enable the checking of the authenticity and integrity of the data. It is assumed that the private key can only be reconstructed from the public key with a very substantial amount of effort. The generation of the key takes place in the RSA method through the algebraic manipulation of large prime numbers. The longer the key, the greater the amount of effort (which must be applied within the required time) for creating the signature and checking the signature. Likewise, however, the longer the key, the greater the security, e.g. the time until the key can be cracked.

The method proposed here uses long asymmetric key pairs in the startup phase and relatively short key pairs in real-time operation, and frequently alters these short key pairs. Thus, in real-time operation, the amount of effort and time necessary for the encryption and decryption is kept low, which is very important in real-time operation. The length of the key is chosen such that an intruder has hardly any chance to crack the key within the validity time. Other methods, for example the method disclosed in reference 1 (Method for real-time data authentication) use key hierarchies with long keys to increase security without making explicit reference to the timeliness of the data In the proposed method, long keys are used in the startup phase so that immediately after startup, certification authority 115 can communicate the association between sender IDs and the public decryption keys to the computer authentically and securely.

The constitution of a typical distributed real-time system is presented in FIG. 1. It is assumed that all computers have access on a global time that is, for example, constructed by means of the IEEE 1588 standards and can be securely distributed by the method described here. In the example in FIG. 1, computer 111 acquires real-time data. This real-time data will be forwarded to processing computer 112 via real-time communication system 120. This real-time communication system can function based on an ethernet or TT ethernet or another real-time communication system. After the processing, processing computer 112 sends the variables to computer 113 via real-time communication system 120 for output to the technical process to be controlled. Computer 114 is a security monitor that checks the security of sensitive real-time messages, that is, messages with content that must be checked for integrity and authenticity. Security monitor 114 receives a copy of all sensitive messages from communications system 120. A message is authentic and integral if the message's signature, which is calculated by the authorized sender with the private portion of the asymmetric key pair, is in agreement with the content of the message, whereby the checking takes place by means of the public portion of this asymmetric key pair. This separation of the processing function in computers 112 and 113 from the security-checking function in computer 114 achieves the result that the processing effort (and thus the processing time) in computers 112 and 113 is not lengthened due to the safeguarding measures during the time-critical servo loop. In this way, the security check is prevented from having negative effects on the quality of the servo loop.

Figure 2:
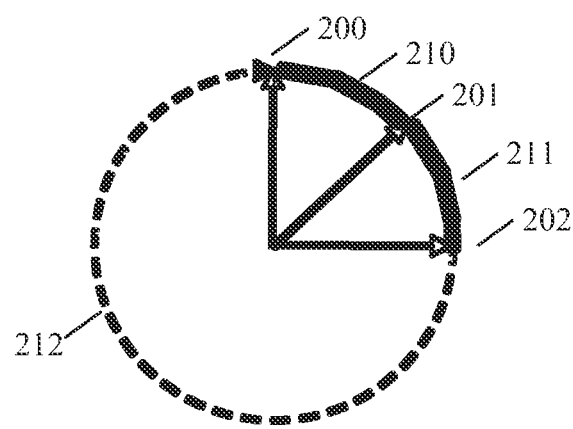
FIG. 2 shows the process steps within one period of the real-time system.

FIG. 2 shows the time course of one period in data acquisition computer 111 in a cyclic format. At the beginning, each period 200 is begun with the acquisition of variable real-time data from an observation. An observation is an atomic triple composed of the name of the observation, the time point of the observation and the value of the observation, which must be processed within its validity period. The acquired data is pre-processed within interval 210, and begins at time point with the transmission of data to processing computer 112 and to security monitor 114. According to the present invention, during time interval 211 between time point 201 and time point 202, a signature for the observation is calculated by means of the private encryption key that is valid for this time point. The signature will be embedded in the real-time message of the next following period. After it has the signature of the previously received real-time message in the next period, security monitor 114 uses the known public key to check whether the signature agrees with the content of the previously received real-time message. The public key, with which the signature is checked, can also be contained directly in the real-time message. The security monitor periodically sends a secure real-time message concerning the results of the security check to the certification authority 115, or to another entity that is responsible for security administration.

After calculation of the signature for the preceding observation, computer 111 begins the calculation of a new asymmetric key pair at time point 202. As the starting point for the calculation of the new key pair, a function is taken from the bit pattern for the calculation stating time point, since this bit pattern of the time display will not repeat within the lifetime of the system. Since the calculation of a new key pair is time-consuming and will not be completed within interval 212 before the next data acquisition time point 200, this background calculation will be interrupted at the beginning of the next period at time point 200, to be able to handle incoming real-time tasks in a timely manner. After completion of the periodic real-time tasks at time point 201 or 202, the key calculation continues during interval 212 until a result is obtained. After the new key pair is available, the public portion of the new key is distributed along with the time point as part of a real-time message secured with the old key, from which point forward the new key will be used. The disclosure of the new key takes place in a sequence of n messages, where the loss of (n−1) messages can be tolerated.

The above-described architecture for safeguarding the integrity and authenticity of real-time data can also be used to ensure data confidentiality. If data is to be sent confidentially from one computer, e.g. computer 111, to computer 112, computer 112 sends the public portion of an asymmetric key by means of a message that preserves authenticity and integrity through the described method to computer 111, which can then encrypt the data to a private text with the key received. Now, only computer 112, which knows the private portion of the asymmetric key pair, is in a position to produce plain text from the private text.

The length of the asymmetric key to be used in the encryption of confidential data depends on the period of time during which the data must be handled confidentially. If this time period is very long, a longer key must be selected. However, there are many cases in real-time systems in which the real-time data have lost their usefulness after a short period of time, so that a shorter key is often sufficient.

Figure 3:
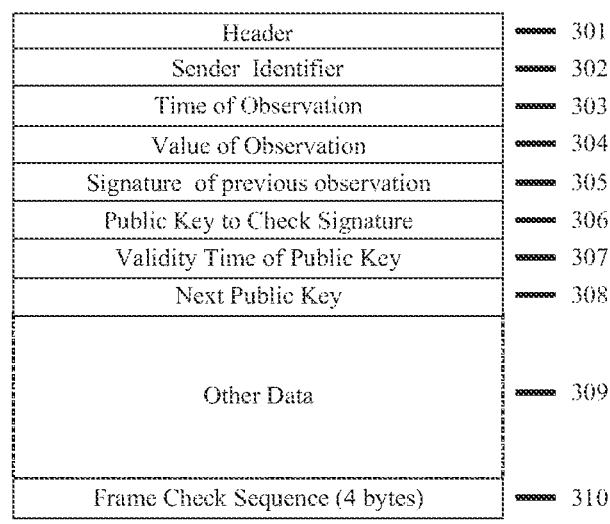
FIG. 3 shows the constitution of a message.

FIG. 3 shows a possible constitution of a real-time message. After header 301 comes the sender ID in field 302, the time point of the observation in field 303, the value of the observation in field 304, the signature for the entire content of the observation of the preceding message in field 305, the public key for use in checking the signature of the message in field 306, the time point for the end of the validity period of this public key in field 307, and the new key to be used from this validity time point forward in field 308. Before the frame check sequence in field 310 is found other non-sensitive data in field 309.

According to the present invention, security monitor 114 sends a periodic message signed with its signature to the security authority 115, or another security entity, to report on the security checks carried out during the past period. If this periodic message reports security breaches or if the report is absent, a security alarm is activated by security authority 115.

If a special bit is placed in header 301 of a message, this means that sensitive information is contained in this message, so this message is sent by switch 120 to the security monitor. The functioning of this switch must be designed to be tamper resistant. A function is implemented as tamper resistant if it is not possible for an unauthorized entity to alter it.

Time is a special type of predictable real-time information. The distribution of time in the form of a synchronization message can be ensured by means of the described method. Since the signature of the synchronization message can be calculated before the point in time at which the synchronization message is sent, it is possible to send the time value and the signature for the time value in a single synchronization message.

Figure 4:
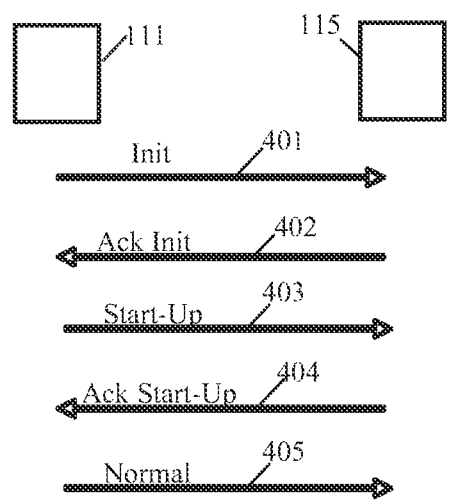
FIG. 4 shows the messaging sequence in the startup phase.

FIG. 4 shows a possible messaging sequence in a secured startup phase of computer 111. Immediately after power-up of computer 111, computer 111 sends an initialization (Init) message 401 to certification authority (CA) 115. This Init message 401 contains the sender ID of computer 111. CA 115 checks whether the sender ID is contained in its a priori known system configuration. This a priori known system configuration specifies which sender IDs are used in which roles in the concrete real-time system. When the outcome from the check is positive, CA 115 responds with an Ack-Init message 402. Ack-Init message 402 contains the current time, the current public key for checking the signature of the time server, and a signature that is created with the private portion of a long asymmetric Ack-Init key pair. The private portion of the Ack-Init key pair must be implemented in a tamper-proof manner. A data structure is implemented in a tamper-proof manner if it is impossible to read the data structure without destroying the component. Computer 111 has secure a priori knowledge of the public portion of the Ack-Init key pair for checking the signature of this Ack-Init message 402, and uses this key to check whether the signature agrees with the content of Ack-Init message 402. If the result this check is positive and the time contained within the Ack-Init message agrees with the time from the time server, computer 111 decides that it is in a proper environment and responds with startup message 403, which contains the following information: the sender ID, the public key to be used for checking the signature of real-time messages produced by computer 111 immediately after startup, and the time point from which this key is to be used. Safeguarding of the authenticity and integrity of this startup message 403 from computer 111, which is not time-critical, takes place through a signature using a long asymmetric startup key pair. The association between the sender ID and the public portion of this startup key pair is known a priori by the CA to be secure. The associations between the public long startup keys of the sender and the corresponding sender IDs must be stored in a tamper-resistant manner in certification authority 115. A data structure is implemented as tamper resistant if it is not possible for an unauthorized entity to alter the data structure. Certification authority 115 can also request from a trusted security center (or corresponding entity) the association between sender ID of computer 111 and the public startup key for checking the signature of startup message 403 of computer 111. This link between the trusted security center and certification authority 115 must be secure. This link can be secured through a long symmetrical key that is known only to certification authority 115 and the trusted security center. This link is not affected by normal maintenance work on the real-time system. After receiving startup message 403 from computer 111 via CA 115, the CA responds with Startup-Ack message 404, which reports to computer 111 that the association between the sender ID of computer 111 and the public portion of the key for checking signatures produced by computer 111 is stored in the CA. After computer 111 receives Startup-Ack message 404, computer 111 begins sending normal real-time messages 405.

Upon request, CA 115 confirms for each requestor the association, valid for a time point, between the sender ID and the public key of a computer for checking the signature of a message from the sender with said sender ID.

The sender ID and the public portion of the Ack-Init key pair in computer 111 must be implemented in a tamper-resistant manner. The private portion of the long asymmetric startup key, which is used after startup, must be implemented in a tamper-proof manner in computer 111.

The described computer configuration from FIG. 1 can also be embodied efficiently on a multiprocessor system-on-chip (MPSoC), whereby the function of switch 120 is taken over by a network-on-chip, and the function of computers 111, 112 and 113 is taken over by the cores of the MPSoC. A specified core 114 takes over the function of the security monitor (security server) and checks the authenticity and integrity of all data sent to the MPSoC.

The following table presents the confidentiality requirements for the security-relevant data to be stored in this architecture:

| Data element | Location | Status | Implementation |
| --- | --- | --- | --- |
| Public portion of the Ack-Init key pair from CA 115 | Computer | Public | Tamper resistant |
| Private portion of the Ack-Init key pair | CA | Private | Tamper proof |
| Public portion of the startup key pair in computer 111 | CA | Public | Tamper resistant |
| Private portion of the startup key pair in computer 111 | Computer | Private | Tamper proof |
| Sender ID in computer 111 | Computer | Public | Tamper resistant |
| Association between the sender ID and the public portion of the startup key pair in computer 111 | CA | Public | Tamper resistant |

The concrete embodiment of the present invention described here presents only one of many possible embodiments of this invention.

The present invention offers the following economic advantages:
The authenticity and integrity of real-time data that are transmitted over an open network are guaranteed.
The quality of the real-time data processing (down time in servo loops) is not adversely affected by the safeguarding measures.
If desired, the confidentiality of the real-time data can also be established.
This method requires few changes in the architecture of existing real-time systems.
The method can be efficiently implemented in the new MPSoCs.

What is claimed is:

1. A method for safeguarding authenticity, integrity and confidentiality of real-time data in a distributed real-time system, comprising a plurality of computers, whereby each computer periodically sends real-time messages with real-time data to the other computers, and whereby one computer takes over the role of a security server, and another computer assumes the role of a certification authority that establishes the authenticity of the public key of a computer, and whereby all computers have access on a common sparse time base, and whereby each computer has at least one private asymmetric key available for creation of a signature that is required for checking the authenticity and integrity of the signed data structure, whereby the private asymmetric key is requested from the certification authority, wherein a secure startup protocol with a long asymmetric key pair is processed with the certification authority immediately after power-up of a computer, and whereby short asymmetric key pairs are used for safeguarding the authenticity and integrity of the real-time data in real-time operation after the end of the startup phase, whereby the key pairs are changed frequently, and whereby confidentiality is ensured with asymmetric key pairs based on the secured authenticity and integrity of the data, whereby the length of the key used depends on the period of time during which the confidentiality of the real-time data must be ensured.

2. The method as recited in claim 1, wherein after the end of the startup phase immediately after acquisition of the real-time data of an observation, a real-time message that contains the observation in plain text is composed and sent, and whereby the next periodic real-time message contains a signature for the observation conveyed in the preceding real-time message, whereby this signature is created through the use of the private key known only to the sending computer and the signature is checked against the associated public key.

3. The method as recited in claim 1, wherein a dedicated process in one of the computers receiving the data uses the public key to determine whether the data received in one period matches the signature associated with the data received in the next period.

4. The method as recited in claim 1, wherein the public key for checking the integrity and authenticity of the data of a real-time message is a portion of the real-time message.

5. The method as recited in claim 1, wherein the dedicated process that undertakes the checking of the real-time data checks whether the public key contained in a real-time message is authentic through communication with the certification authority.

6. The method as recited in claim 1, wherein the private key for creating the signature and the public key for checking the signature are continually changed during real-time operation.

7. The method as recited in claim 1, wherein, as soon as the time period for a real-time operation is completed, a sending process generates a new asymmetric key pair in the background and announces the new public key including the time point when the new public key's validity period begins in a plurality of real-time messages signed with the old key prior to the expiration of the old key's validity, and whereby the sending process uses the private portion of the key known only to the sending process to create the signature starting from the given time point when the validity period begins.

8. The method as recited in claim 1, wherein, immediately after power-up of a computer, the computer sends an initialization message with a sender ID identification to the certification authority, and whereby the certification authority checks whether the sender ID identification is contained in its a priori known system configuration, and whereby with a positive outcome for the check, the certification authority responds with an Ack-Init message that contains the current time, the current public key for checking the signature of a time server and a signature that is created with the private portion of a long asymmetric Ack-Init key pair, and whereby the private portion of the Ack-Init key pair is implemented in the certification authority in a tamper-proof manner, and whereby the computer knows a priori the public portion of the Ack-Init key pair for checking the signature of the Ack-Init message, and whereby the computer uses this key to check whether the signature and the content of the Ack-Init message are in agreement, and whereby the computer further checks whether the time contained in the Ack-Init message agrees with the secure time from the time server, and in the case the result of these checks is positive, the computer responds to the certification authority with a startup message, whereby the startup message contains the sender ID of the computer, the public key to be used for checking the signature of the messages produced by the computer immediately after startup, and the time point from which the public key is to be used, and whereby the safeguarding of authenticity and integrity takes place through a signature created by the computer using a long asymmetric startup key pair, whereby the private portion of the startup key pair is stored in computer in a tamper-proof manner, and whereby the association between the sender ID and the public portion of the startup key pair is known a priori by the certification authority to be secure, and whereby the association is stored in the certification authority in a tamper-resistant manner, and whereby the certification authority responds with a startup Ack message before the computer begins with normal real-time processing.

9. The method as recited in claim 1, wherein a trusted security center of the certification authority communicates via a secure channel the association between the sender ID stored in a tamper-proof manner in each computer and the public key to be used after startup for checking the signature of the sender's message, whereby the private portion of this key is stored in a tamper-proof manner in each computer.

10. The method as recited in claim 1, wherein a sending computer uses the bit pattern of the time point for beginning the creation of a new key as the starting value for the calculation of a new random number.

11. The method as recited in claim 1, wherein for the confidential transmission of data on a computer, the computer sends to the sender of the confidential data the public portion of an asymmetric key pair corresponding to the method as recited in claim 1, whereby said sender then generates a private text using the received key and sends the private text back to the computer that sent the public portion of an asymmetric key pair.

12. The method as recited in claim 1, wherein the sender of confidential data allows the length of the key used for encryption of the data depend on the period of time during which the data is to be treated as confidential.

13. The distributed real-time system as recited in claim 1, wherein the security server periodically sends an encrypted real-time message to the certification agency that contains the results of checking sensitive messages within the previous period.

14. The distributed real-time system as recited in claim 1, wherein the current time value, the signature of the time value and the public key for checking the signature are transmitted in a single synchronization message.

15. The distributed real-time system as recited in claim 1, wherein the data field of a real-time message contains the time-point of observation of the real-time data.

16. A distributed real-time system comprising a plurality of computers that are linked to a central switch and whereby each computer sends periodic real-time messages with real-time data to the other computers, and whereby a distinction is made between sensitive and non-sensitive real-time messages, and whereby the sensitive real-time messages that contain sensitive real-time data are recognized through an a priori specified identification in the data field, and whereby all computers have access to a common sparse time base and whereby each computer is provided with a minimum of one private asymmetric key for creating a signature for a data structure that is required for checking the authenticity and integrity of the signed data structure, the private asymmetric key being requested from the certification authority, and whereby the key for checking the signature is known to the public, wherein the switch sends all sensitive real-time messages, in addition to the recipients mentioned therein, to a specified computer, the security server, and whereby each computer periodically sends real-time messages with real-time data to the other computers, and whereby one computer takes over the role of a security server, and another computer assumes the role of a certification authority that establishes the authenticity of the public key of a computer, and whereby all computers have access on a common sparse time base, wherein a secure startup protocol with a long asymmetric key pair is processed with the certification authority immediately after power-up of a computer, and whereby short asymmetric key pairs are used for safeguarding the authenticity and integrity of the real-time data in real-time operation after the end of the startup phase, whereby the key pairs are changed frequently, and whereby confidentiality is ensured with asymmetric key pairs based on the secured authenticity and integrity of the data, whereby the length of the key used depends on the period of time during which the confidentiality of the real-time data must be ensured.

17. The distributed real-time system as recited in claim 16, wherein the sender of the sensitive real-time messages to the specified computer through the switch is designed to be tamper resistant.

18. The distributed real-time system as recited in claim 16, wherein the security server checks the authenticity and integrity of the sensitive real-time messages that the security server receives from the switch using a method for safeguarding authenticity, integrity and confidentiality of real-time data in a distributed real-time system.

19. A multiprocessor system-on-chip (MPSoC) with a distributed real-time system as recited in claim 16 implemented thereon, whereby a network on chip of the MPSoC takes over the role of the switch, the function of the computers of the distributed real-time system is taken over by the cores of the MPSoC, and the Security Server is a dedicated core of the MPSoC.

* * * * *